United States Patent [19]

Cuomo et al.

[11] Patent Number: 5,478,270
[45] Date of Patent: Dec. 26, 1995

[54] ULTRASONIC MICRO MACHINING SLIDER AIR BEARINGS WITH DIAMOND FACED PATTERNED DIE

[75] Inventors: Jerome J. Cuomo, Lincolndale, N.Y.; Randall T. Kerth; John C. Major, both of San Jose, Calif.

[73] Assignee: International Business Machines Corporation, Armonk, N.Y.

[21] Appl. No.: 187,268

[22] Filed: Jan. 25, 1994

[51] Int. Cl.[6] .............................. B24B 1/00; B24B 35/00
[52] U.S. Cl. .................... 451/5; 451/56; 451/165
[58] Field of Search .................... 451/5, 11, 27, 451/36, 37, 56, 164, 165

[56] References Cited

U.S. PATENT DOCUMENTS

| | | | |
|---|---|---|---|
| Re. 25,033 | 8/1961 | Balamuth et al. | 451/164 |
| 2,580,716 | 1/1952 | Balamuth | 451/165 |
| 2,774,193 | 12/1956 | Thatcher et al. | 451/164 |
| 2,791,674 | 5/1957 | Westin et al. | 219/154 |
| 4,071,385 | 1/1978 | Kuns | 451/165 |
| 4,132,038 | 1/1979 | O'Connor | 451/165 |
| 4,343,111 | 8/1982 | Inoue | 451/165 |
| 4,731,019 | 3/1988 | Martin | 433/119 |
| 4,884,476 | 12/1989 | Okuzumi et al. | 76/101 R |
| 4,934,103 | 6/1990 | Campergue et al. | 451/165 |
| 4,990,403 | 2/1991 | Ito | 428/408 |
| 5,022,801 | 6/1991 | Anthony et al. | 408/144 |
| 5,070,040 | 12/1991 | Pankove | 437/209 |
| 5,076,026 | 12/1991 | Mizuguchi et al. | 451/165 |
| 5,185,957 | 2/1993 | Mizuguchi et al. | 451/165 |
| 5,187,899 | 2/1993 | Rhoades | 451/165 |
| 5,230,182 | 7/1993 | Daniell et al. | 451/165 |

*Primary Examiner*—Maurina T. Rachuba
*Attorney, Agent, or Firm*—Baker, Maxham, Jester & Meador

[57] ABSTRACT

A method of machining a complex pattern into the air bearing surface of a magnetic head slider includes the steps of forming a die with a diamond surface which has a pattern which is a reverse image of the desired pattern for the surface of the slider; placing the die with the pattern of the die facing the surface of the slider; placing an abrasive slurry between the die and the surface of the slider; applying a pressure between the die and the surface of the slider; and ultrasonically vibrating the die and the slider reciprocally with respect to one another to cause the abrasive slurry to grind the desired pattern into the surface of the slider.

34 Claims, 4 Drawing Sheets

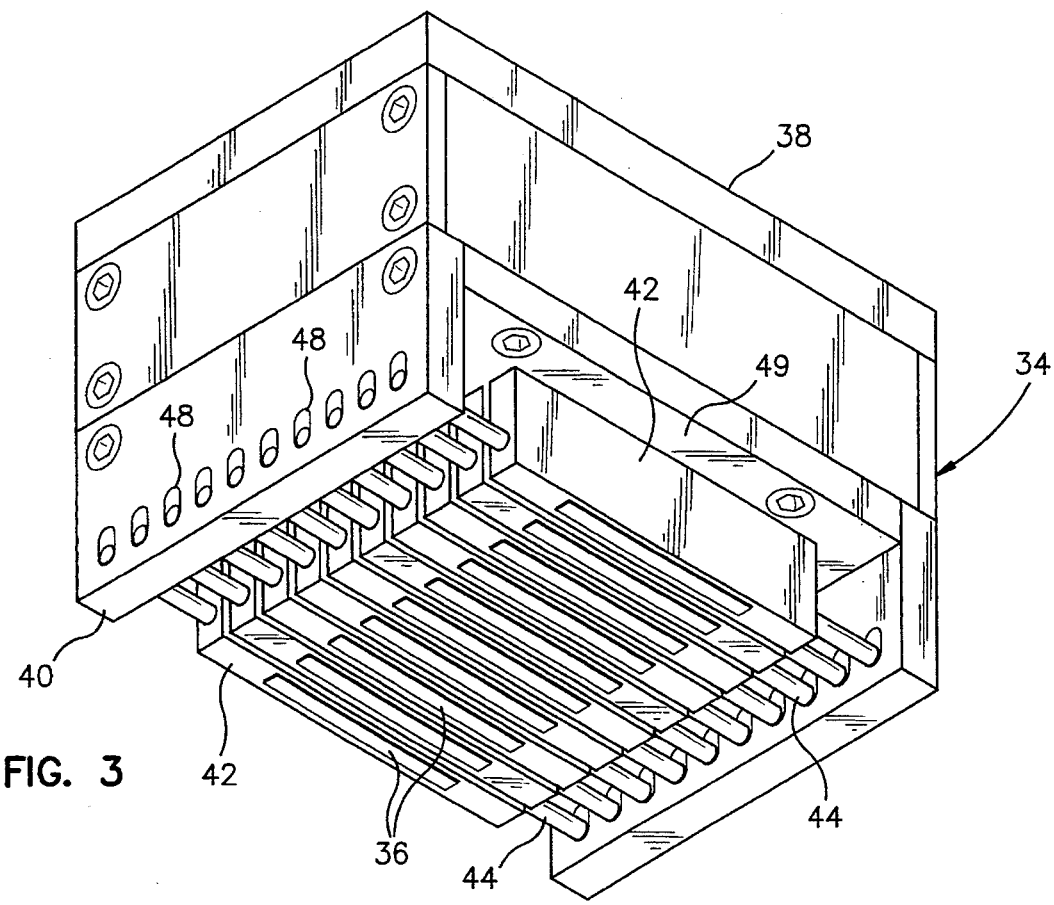
FIG. 3
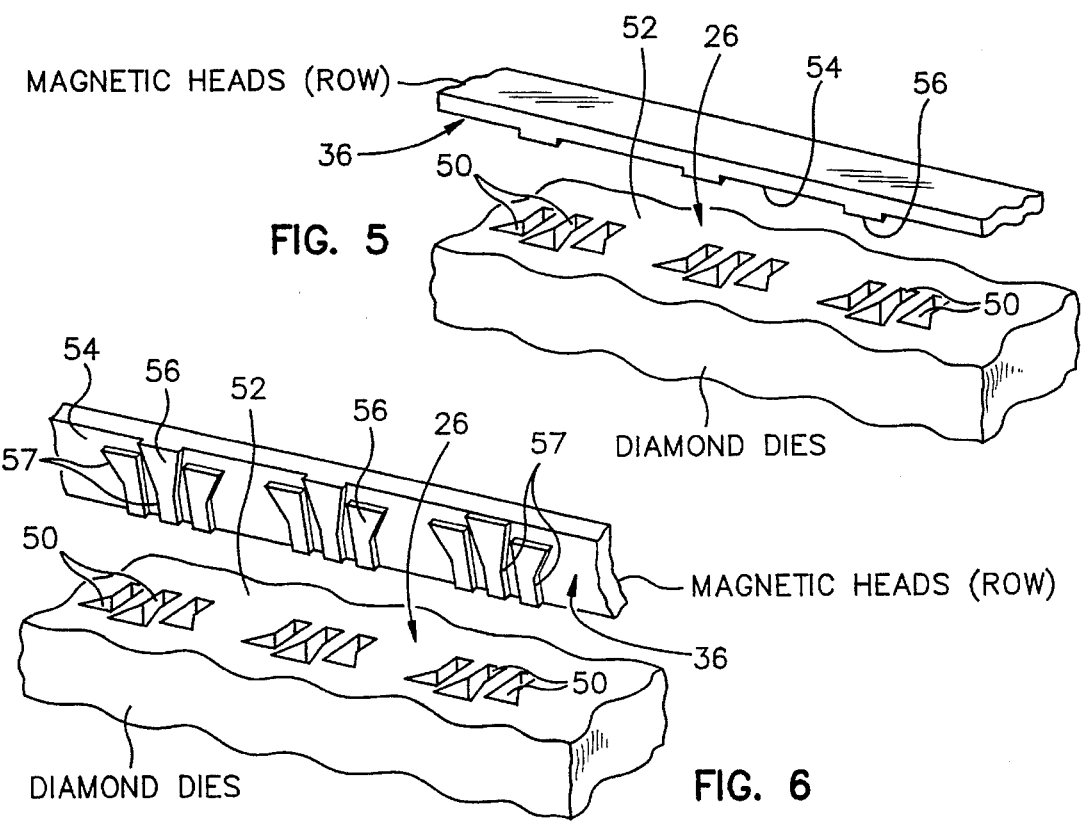
FIG. 5
FIG. 6

(LAPPING)

ULTRASONIC MICRO MACHINING SLIDER AIR BEARINGS WITH DIAMOND FACED PATTERNED DIE

BACKGROUND OF THE INVENTION

1. Field of the Invention

The present invention relates to a method of ultrasonically micro machining a workpiece with a diamond faced patterned die, and more particularly, to micro machining air bearing surfaces of magnetic head sliders with a complex pattern to control flying height of each slider above a spinning magnetic disk.

2. Description of the Related Art

In magnetic disk media drives, inductive thin film magnetic heads are normally used for implementing read/write functions. When a disk is rotated, a surface of the disk carries a thin film of air ("air bearing") which supports a slider on which a magnetic head is mounted at some height ("flying height") above the surface. The flying height depends upon the configuration of the slider. It is desirable that the flying height be as low as possible. The lower the flying height, the greater the amount of data stored per unit area of the disk surface.

In order to lower the flying height, sliders are typically configured with two or more rails. These rails are formed by machining the air bearing surface of the slider with one or more grinding wheels. One problem with this machining process is that the grinding wheel chips portions of the slider which are outside of the intended grinding area. Another problem is that the heat generated during the grinding process can cause stress of the ceramic slider material. This chipping and/or stress of the slider material can affect the magnetic head's reading and writing functions as well as its flying height. Another problem with machining is that the grinding wheel is capable of only machining straight patterns into the slider air bearing surface. It has recently been found that more complex patterns in the air bearing surface of a slider result in a lower flying height than that obtainable by two or more rails.

In order to obtain a complex slider air bearing pattern, sliders have been machined by using a reactive ion etching process. With this process, a magnetic head slider can be machined to any desired shaped pattern. A problem with the reactive ion etching process, however, has been the inability to obtain sheer walls in the pattern, namely, walls which are true to form and perpendicular to the flying surface of the slider. The reactive ion etching process typically results in the sloping (non-perpendicular) walls taking on a sloping configuration. Sloping walls make it very difficult to control the final desired pattern of the slider air bearing surface. This is especially true when the air bearing surface is lapped after the pattern is formed. Other problems with the reactive ion etching process are that it is time-consuming, requires a clean room, has many process steps, uses extensive amounts of chemicals, creates redeposition on the workpiece, produces corrosive byproducts, creates particulate contaminants, and requires expensive capital equipment and maintenance. Neither the grinding wheel process or the reactive ion etching process is conducive to mass machining magnetic head sliders nor are they conducive to reproducible products from one production run to the next.

SUMMARY OF THE INVENTION

The present invention provides a low-cost mass production method of machining complex patterns with sheer walls into workpieces, such as magnetic head sliders, which are reproducible from one production run to the next. These features and other features, which will be described hereinafter, are accomplished by a multi-step process. The working surface of a die is formed with a pattern which is a reverse image of the desired pattern for the air bearing surface of a magnetic head slider. Preferably, the pattern is formed in a solid diamond die using a laser milling process. With this arrangement, the die is well-formed with sheer walls and is not subject to wear upon repetitive use. The die is placed with its patterned surface facing the air bearing surface of the slider. An abrasive slurry is dispersed between the die and the air bearing surface, and pressure is applied therebetween. The die and the slider are then ultrasonically reciprocally moved with respect to one another to cause the abrasive slurry to grind the desired pattern into the air bearing surface of the slider. This process is especially useful for simultaneously machining a large number of magnetic head sliders. Rows and columns of appropriately milled diamond faced dies can be employed to machine corresponding rows and columns of magnetic head sliders in one operation. Because of the diamond material, the dies can be utilized many times to obtain a very high number of reproducible production runs. During the machining process there is virtually no heat generated and no chipping outside of the desired machining area, resulting in a higher quality end product and a higher yield. The sliders can be lapped by flat grinding of the air bearing surface after the pattern is formed since the sheer walls maintain the desired slider surface configuration. One of the main advantages of this process is that it can obtain the desired complex patterns at a low cost, compared to other prior art processes.

An object is to provide a process for machining complex patterns with sheer walls into the surface of a workpiece.

Another object is to achieve the foregoing object as well as achieving depth control of contours formed in the workpiece surface by the process.

A further object is to achieve any of the foregoing objects as well as eliminating chipping and/or heat stress of the workpiece during implementation of the process.

Yet another object is to achieve any of the foregoing objects as well as obtaining high yield mass production of the workpieces.

Still another object is to achieve any of the foregoing objects as well as achieving reproducible products from one production run to the next.

Still a further object is to achieve any of the foregoing objects as well as achieving low cost production runs.

Still another object of the present invention is to achieve any of the foregoing objects when the workpiece includes one or more slider air bearing surfaces.

Other objects will become apparent when considered in light of the following description of the invention.

BRIEF DESCRIPTION OF THE DRAWINGS

FIG. 3 is an isometric illustration of rows and columns of sliders which are mounted, via their corresponding magnetic heads, to a fixture.

FIG. 5 is an isometric exemplary illustration of three diamond dies, which are broken away from a multi die setup, and three magnetic head sliders, which are broken away from a row of magnetic head sliders.

FIG. 6 is the same as FIG. 5 except the magnetic head sliders have been rotated away from the diamond dies to show the complex pattern machined in the sliders by the dies.

DETAILED DESCRIPTION OF THE PREFERRED EMBODIMENTS

Figure 1:
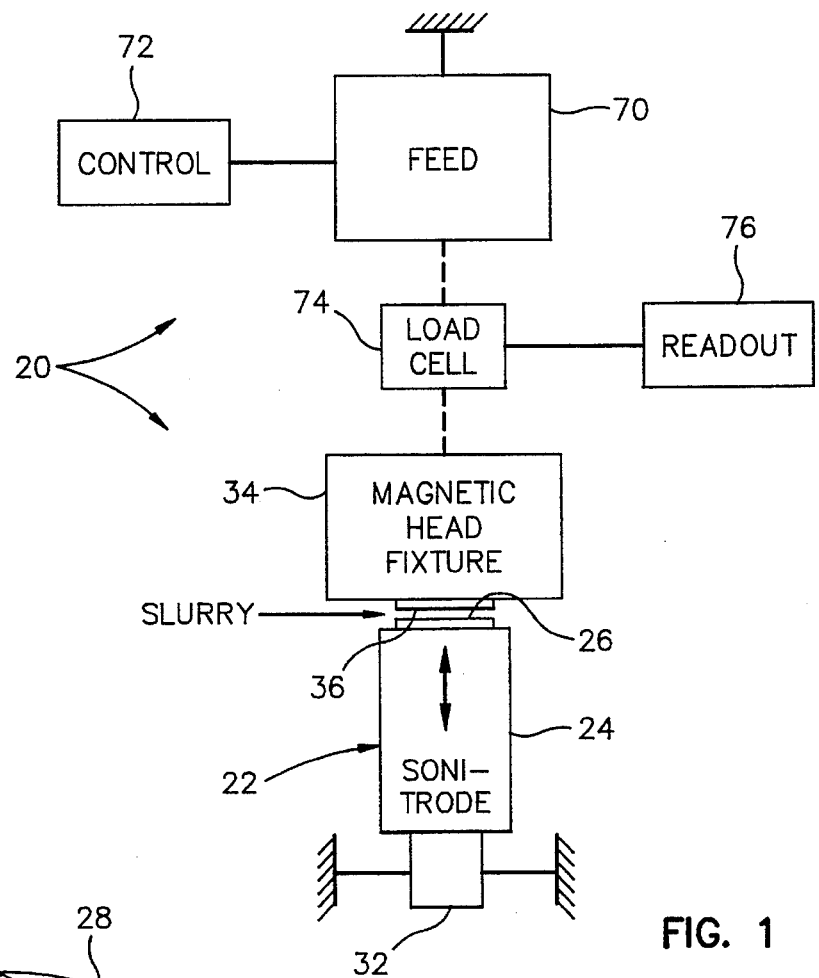
FIG. 1 is a schematic illustration of an exemplary manufacturing setup for implementing the present process. vibrating the sonitrode, the sonitrode including rows and columns of patterned diamond dies.
Figure 2:
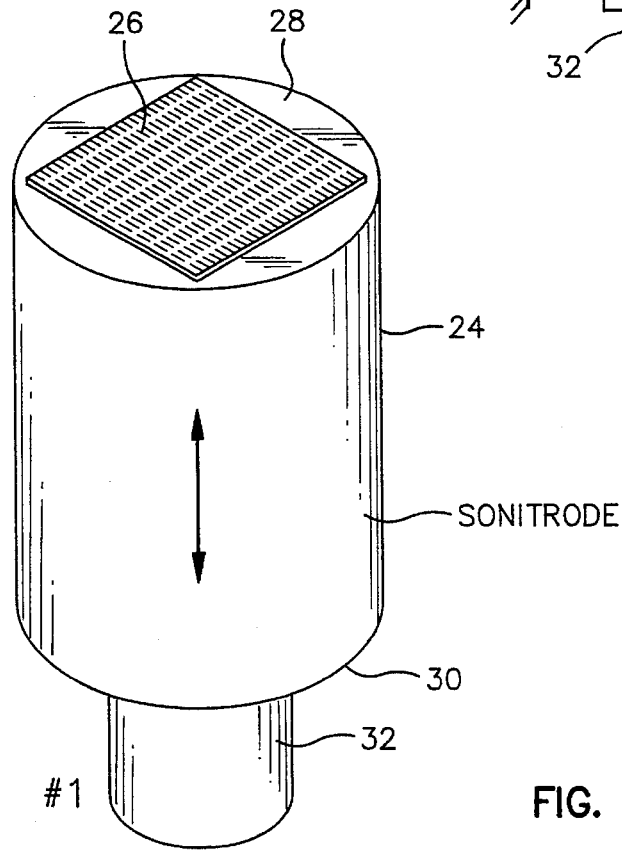
FIG. 2 is a isometric illustration of a sonitrode and a transducer for ultrasonically

Referring now to the drawings, wherein like reference numerals designate like or similar parts throughout the several views, there is illustrated in FIG. 1 an exemplary manufacturing setup 20 for implementing the process of the present invention. The manufacturing setup 20 includes a sonitrode 22 which comprises a body 24 and one or more patterned diamond dies 26. As shown in FIG. 2, the body 24 is elongated and has a pair of oppositely facing ends 28 and 30. At one end 28, rows and columns of patterned diamond dies 26 are mounted and at the opposite end 30, a transducer 32 is mounted. The transducer may in turn be fixed in place as shown in FIG. 1. The transducer 32 is capable of reciprocal ultrasonic vibration, as shown by the arrow on the body 24. A desired frequency of reciprocal movement is in the range of 19 KHZ–21 KHZ. It is desirable that the physical dimensions of the sonitrode 22 be chosen so that its resonant frequency is within this range. It is also desirable that the sonitrode 22 face upwardly, as shown in the manufacturing setup of FIG. 1, for purposes which will be explained in detail hereinafter.

Located above the sonitrode 22 is a fixture 34 for mounting one or more magnetic head sliders 36. As shown in FIG. 3, the fixture 34 has top and bottom ends 38 and 40. Rows and columns of the magnetic head sliders 36 are mounted on the bottom end of the fixture 34. In this fixture, which is exemplary, a plurality of plates 42 may be mounted by pins 44 which can reciprocate slightly in an up-and-down direction within slots 48 in opposite sides of the fixture. Each lower edge of a plate mounts a respective row of magnetic head sliders. Fixation can be accomplished with epoxy or double sided tape. Springs (not shown) may be located within the fixture and in engagement with top edges 49 of the plates 42 for urging the plates downwardly. This arrangement provides a good alignment of the magnetic head sliders during pattern formation. In the exemplary embodiment illustrated in FIG. 3, there are 10 rows of magnetic head sliders with each row containing 26 heads. Each row of magnetic head sliders is approximately 50 mm long. With this arrangement, the magnetic head sliders can be mass produced by the process of the present invention. Magnetic head sliders are constructed of a very hard ceramic material which is difficult to accurately machine into a desired pattern. One of the primary advantages of the invention is that a complex pattern with sheer walls can be machined into a magnetic head slider.

Three diamond dies, each with the same complex pattern, are illustrated in FIG. 5. It should be noted that the walls 50 of the pattern are very sheer, which means that they are planar and perpendicular to a top flat surface 52 of the combined dies. When this die is ultrasonically vibrated with an abrasive slurry against the bottom surfaces 54 of the three magnetic head sliders 36, a pattern 56, which has a reverse image of the pattern of each die, is machined into each slider surface. Relatedly, the slider surfaces to be machined are air bearing surfaces which, according to the invention, may be selectively patterned by the invention.

Figure 7:
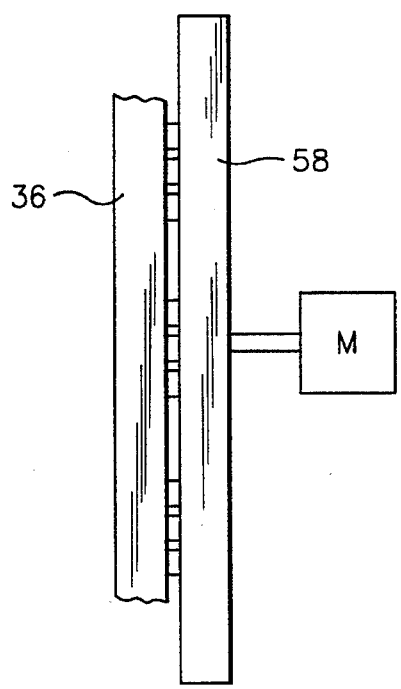
FIG. 7 is a schematic illustration of magnetic head sliders being lapped after milling the complex pattern therein.

Continuing with the description, the pattern of a single die 26 and a single magnetic head slider 36 are reverse images of one another. It should be noted that after machining the magnetic head sliders 36 (see FIG. 6) the recesses in the slider surfaces produced by machining have sheer walls 57. This is a result of the sheer walls 50 of the diamond dies 26. The sheer walls of the die are important for accurately producing the desired pattern of the air bearing surface of each magnetic head slider. As shown in FIG. 7, it should be noted that the air bearing surfaces of the magnetic head sliders can be lapped by a grinder 58 without altering this pattern. If the patterned walls 57 were sloping instead of perpendicular the lapping operation would change the facial configuration since the grinding occurs across nonperpendicular walls. The air bearing surface pattern shown in FIG. 6, which is essentially three contoured rails for each magnetic head, has been found to provide a lower flying height for the magnetic head slider above a spinning magnetic disk (not shown). It is to be understood that this pattern is exemplary and that there may be other complex patterns that may be desirable for improved magnetic head performance.

Figure 8:
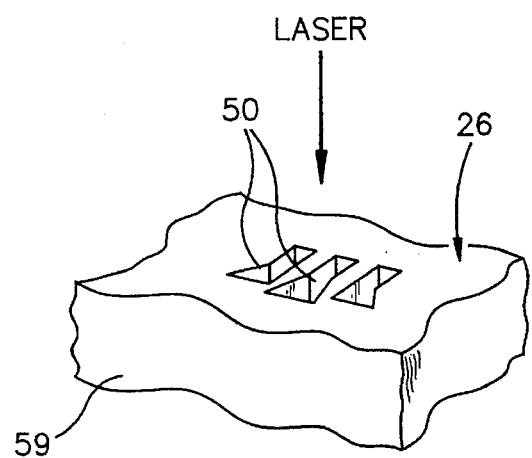
FIG. 8 is an exemplary illustration of a method of forming the complex pattern in diamond material to form a diamond die.
Figure 9:
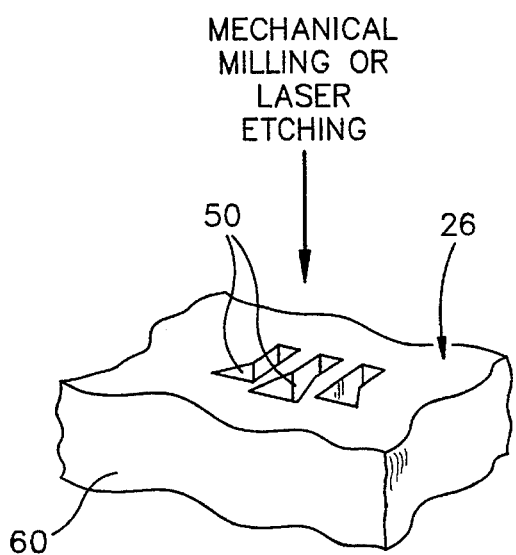
FIG. 9 is an illustration of forming a complex pattern in a non-diamond die.
Figure 10:
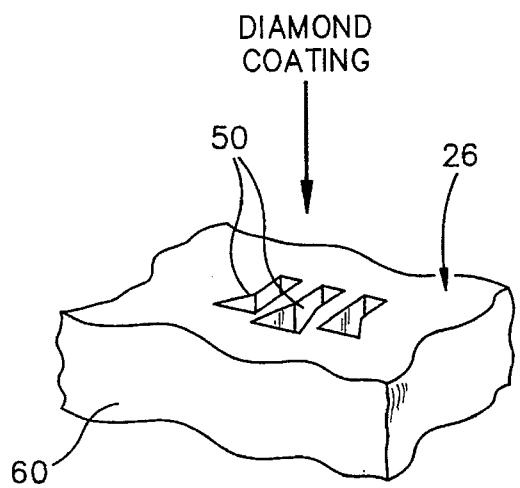
FIG. 10 is an illustration of the non-diamond die of FIG. 9 being coated with a diamond material.

In the preferred embodiment, the diamond die or dies 26 are constructed of a solid diamond material 59. Polycrystalline diamond slabs with dimensions of 50×50×0.5 mm can be made. Experimentally, sample polycrystalline diamond slabs have been made up to 125 mm square. A large diamond slab is made and then milled with a laser to form patterned dies which are arranged in a plurality of rows and columns. One die of the slab with three configured holes milled with a laser is shown in FIG. 8. Either a YAG laser or an eximer laser can be employed for milling the pattern. The YAG laser is operated by a computer to obtain the desired pattern, whereas the eximer laser employs a mask. Both of these processes, which will mill sheer walls 50 in the diamond slab 59, are well-known and will not be described in more detail herein. An optional die arrangement may be to mechanically mill or laser etch a non-diamond slab 60, such as metal or ceramic, to form a plurality of dies 26 which are arranged in rows and columns. One non-diamond die of the slab is shown in FIG. 9. With a metal slab 60 and standard milling processes, sheer walls 50 can be obtained for the pattern. Next, the patterned slab 60 is coated with a diamond material, as shown in FIG. 10. This coating can be accomplished with a vapor process of the polycrystalline diamond. The end result is a plurality of complex patterned dies which are diamond coated and which are arranged in rows and columns. Only one such completed coated diamond die of the slab is shown in FIG. 10. This die is not quite as desirable as the solid diamond die shown in FIG. 8; however, its performance still greatly exceeds prior art processes. The diamond slab of dies or the diamond coated slab of dies is then affixed to the top end 28 of the sonitrode 24 as shown in FIG. 2. The fixation can be accomplished by epoxy, double sided tape, soldering, or brazing.

As shown in FIG. 1, the fixture 34 is mechanically connected to a feed device 70 which is capable of moving the fixture 34 and the mounted magnetic head sliders 36 toward and away from the patterned diamond dies 26 of the sonitrode 22. The feed device 70 may be provided with a control 72 for controlling the forward and reverse feeds of the fixture 34. The feed device may be of any of the well-known types, such as worm drive, pneumatic drive, or hydraulic drive. Mechanically interconnected between the fixture 34 and the feed device 70 there may be a load cell 74 which has a readout indicator 76. The load cell enables an operator to accurately control the pressure applied by the fixture 34 to the sonitrode 22. It has been found that a pressure of 1½ kilograms per row of magnetic head sliders with 26 magnetic head sliders in a row has performed satisfactorily with the slurries to be described in the next paragraph.

Before and during the machining of the magnetic head sliders 36 by the diamond dies 26, an abrasive slurry is dispersed therebetween. A slurry which has been employed satisfactorily with the aforementioned pressure includes boron carbide or silicon carbide with a grit in the range of 1000 to 1500 in a water base. The finer the grit, the longer it takes to complete the machining operation. It should be noted that the slurry is introduced on top of the diamond dies 26 of the sonitrode 22. Consequently, any excess slurry flows downwardly along the body 24 and possibly the transducer 32. Since these are all closed elements, there is no contamination problem. Visualize, however, if the setup 20 in FIG. 1 were turned upside down and the slurry was dispersed on top of the magnetic head sliders 36. Excess slurry would then flow into and out around the fixture 34 to the load cell 74 and the feed device 70, contaminating these normally open elements. Accordingly, it is a distinct advantage to have the sonitrode 22 facing upwardly to receive the abrasive slurry. Theoretically, the abrasive slurry is the only material that contacts the magnetic head sliders 36 to perform the machining operation. Depending upon the length of the machining operation, the slurry may have to be dispersed one or more additional times after the original dispersion. The ultrasonic movement of this slurry machines the desired complex patterns into the magnetic head sliders 36 with virtually no generation of heat. This eliminates stress of the magnetic head sliders which was caused by prior art machining processes. Conceivably, the feed device 70 could be connected to the bottom of the transducer 32 for feeding the sonitrode 22 toward the fixture 34. Further, the magnetic head sliders could be mounted on the sonitrode and the dies could be mounted on the fixture. However, these arrangements are not preferred embodiments.

Methods of the Invention

Figure 4:
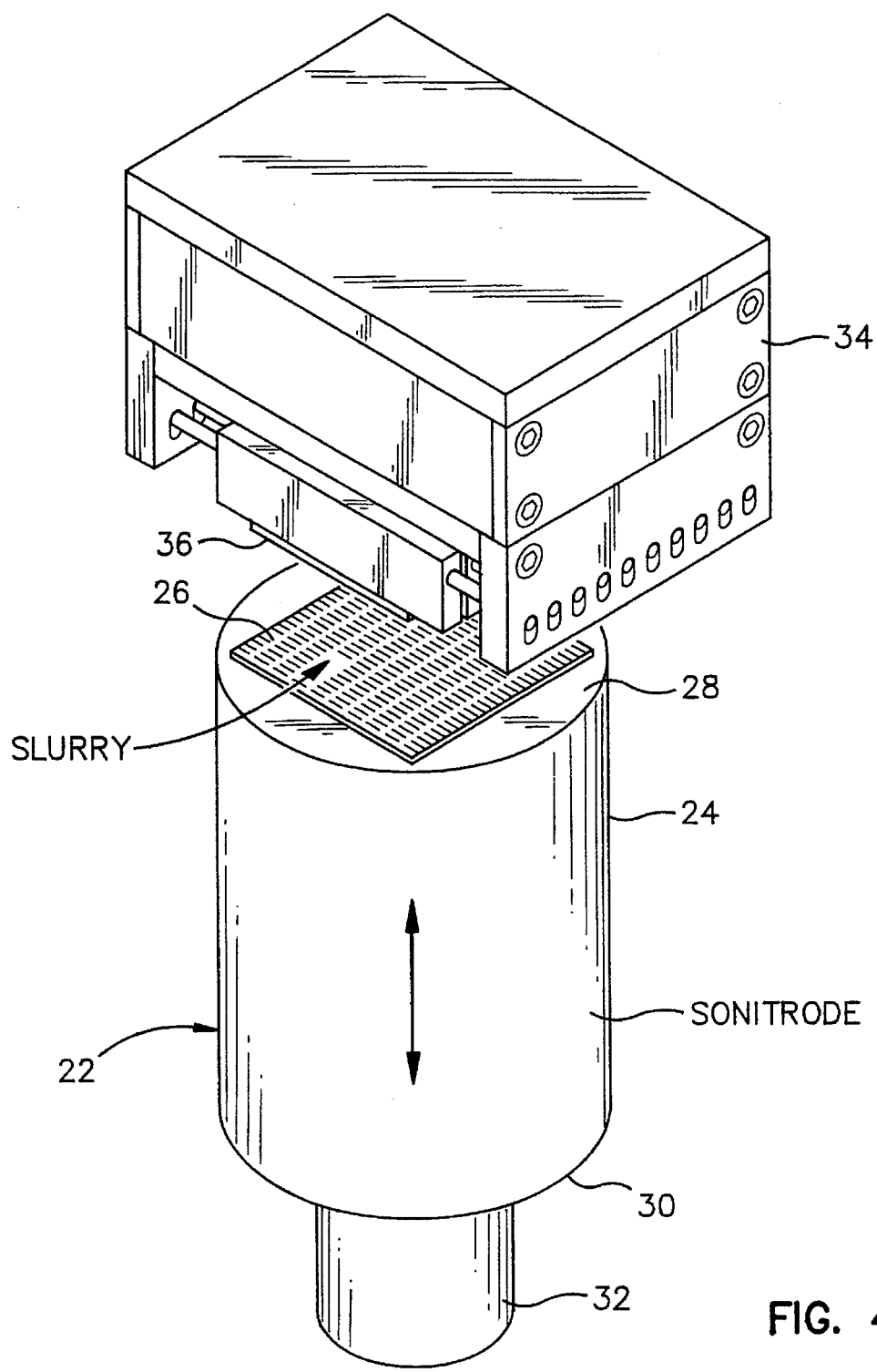
FIG. 4 is an isometric illustration of the sonitrode and the fixture with the patterned diamond dies facing the magnetic head sliders in a readied position for the machining process.

The method of the invention includes machining a pattern into the surface of a workpiece, such as the air bearing surface of a magnetic head slider 36, comprising the steps of forming a die 26 with a diamond surface which has a pattern which is a reverse image of the desired pattern for the air bearing surface of the slider (see FIG. 6); placing the die with the pattern of the die facing the air bearing surface of slider (see FIGS. 1 and 4); placing an abrasive slurry between the die and the air bearing surface of the slider (see FIG. 1 ); applying a pressure between the die and the air bearing surface of the slider (see FIG. 1); and ultrasonically relatively vibrating the die and the slider toward and away from one another to cause the abrasive slurry to grind the desired pattern into the air bearing surface of the slider (see FIGS. 1 and 6). Preferably, the diamond die is ultrasonically vibrated toward and away from the air bearing surface of the slider at a rate of 19 KHZ to 21 KHZ. Further, a slurry which includes boron carbide or silicon carbide with a grit in the range of 1000 to 1500 in a water base is employed with a pressure between the fixture and the sonitrode being in the order of 1½ kilograms per row of sliders, with each row being approximately 50 mm long and containing 26 magnetic head sliders.

Preferably, the process is utilized for machining complex patterns into the air bearing surfaces of magnetic head sliders. The process encompasses machining a plurality of rows and columns of sliders simultaneously in one process step. For instance, 260 sliders (10 rows of magnetic head sliders with each row containing 26 sliders) can be simultaneously machined with the desired patterns. In one embodiment, the row of sliders is 50 mm long and the pressure applied between the dies and the sliders by the feed device 70 of FIG. 1 is in the order of 1½ kilograms per row of sliders. In this embodiment a slurry with boron carbide or silicon carbide with a grit in the range of 1000 to 1500 in a water base was used. The process includes fixedly mounting the diamond dies 26 with the patterns of the dies facing upwardly and feeding the magnetic head sliders 36 downwardly toward the diamond dies until the abrasive slurry grinds the desired pattern for the air bearing surfaces of the sliders. As shown in FIGS. 1 and 2, the sonitrode 22 is provided with an elongated body 24. The process includes connecting the diamond dies 26 to one end of the elongated body and connecting a transducer 32 to the other end thereof. The process also includes lapping the surfaces of the magnetic head sliders after they have been machined with the desired complex pattern.

In the preferred method, a solid piece (slab) of diamond material is provided for the die and this diamond material is laser milled to provide a reverse image of the desired pattern for the air bearing surface of the magnetic head slider. Optionally, the method may include providing a rigid piece of non-diamond material with a reverse image of the desired pattern for the air bearing surface of the magnetic head slider and then coating the rigid piece of material with diamond material, such as by sputtering or vapor deposition.

It is now manifest that the present invention provides a method of accurately milling complex patterns with sheer walls into a large number of slider air bearing surfaces in one simultaneous operation with high reproducibility between production runs. This is enabled by the solid diamond or diamond coated complex pattern of an array of dies. Accurately controlled depths of the pattern can be easily machined ;into each air bearing surface. After machining, the air bearing surfaces can be lapped without changing the machined configuration of the surfaces. With the present process there is no chipping of areas that are not to be machined, and there is virtually no heat to cause any stress on the slider material. A very important feature of the process is that it is low in cost in comparison to other processes, and can be easily operated to achieve the desired results.

We claim:

1. A method of machining a pattern into the surface of a workpiece comprising the steps of:

forming a die with a diamond surface which has a pattern, the pattern being a reverse image of the desired pattern for the surface of the workpiece;

placing the die with the pattern of the die facing the surface of the workpiece;

placing an abrasive slurry between the die and the surface of the workpiece;

applying a pressure between the die and the surface of the workpiece; and reciprocally moving the die and the workpiece with respect to one another to cause the abrasive slurry to grind the desired pattern into the surface of the workpiece.

2. A method as claimed in claim 1 wherein the step of reciprocally moving the die and the workpiece includes the step of:

ultrasonically vibrating the die in a reciprocatory motion toward and away from the surface of the workpiece.

3. A method as claimed in claim 2 including the step of:

reciprocating the diamond die toward and away from the surface of the workpiece at a rate of 19 KHZ–21 KHZ.

4. A method as claimed in claim 2 wherein the step of forming the die includes the step of:

providing a solid piece of diamond material for the diamond die; and laser etching the solid piece of diamond material with the reverse image of the desired pattern for the surface of the workpiece.

5. A method as claimed in claim 2 wherein the step of forming the die includes the steps of:

providing a rigid piece of material with a reverse image of the desired pattern for the surface of the workpiece; and coating the rigid piece of material with diamond material.

6. A method as claimed in claim 2 including the steps of:

fixedly mounting the diamond die with the pattern of the die facing upwardly;

feeding the workpiece downwardly toward the diamond die until the abrasive slurry grinds the desired pattern in the surface of the workpiece.

7. A method as claimed in claim 2 including the steps of:

positioning the diamond die with its patterned surface facing upwardly; and positioning the workpiece with its surface facing downwardly.

8. A method as claimed in claim 2 including the step of:

using a slurry which :includes a carbide with a grit of 1000–1500 in a water base.

9. A method as claimed in claim 2 wherein the workpiece and its surface is a slider of a magnetic head, the slider having an air bearing surface.

10. A method of configuring the air bearing surface of a slider of a magnetic head including the method of machining as claimed in claim 9, the method of configuring including the step of:

after machining the pattern into the surface of the slider of the magnetic head, then lapping the surface of the slider.

11. A method as claimed in claim 10 wherein the step of reciprocally moving the die and the workpiece includes the step of:

reciprocating the diamond die toward and away from the surface of the workpiece at a rate of 19 KHZ–21 KHZ.

12. A method as claimed in claim 11 wherein the step of forming the die includes the steps of:

providing a rigid piece of material with a reverse image of the desired pattern for the surface of the slider; and coating the rigid piece of material with diamond material.

13. A method as claimed in claim 11 wherein the step of forming the die includes the steps of:

providing a solid piece of diamond material for the diamond die; and laser etching the solid piece of diamond material with the reverse image of the desired pattern for the surface of the slider.

14. A method as claimed in claim 13 including the steps of:

fixedly mounting the diamond die with the pattern of the die facing upwardly;

feeding the slider downwardly toward the diamond die until the abrasive slurry grinds the desired pattern in the surface of the slider.

15. A method as claimed in claim 14 including the steps of:

positioning the diamond die with its patterned surface facing upwardly; and positioning the magnetic head with the air bearing surface of its slider facing downwardly.

16. A method as claimed in claim 15 including the step of:

using a slurry which includes a carbide with a grit of 1000–1500 in a water base.

17. A method of configuring the air bearing surface of a slider of a magnetic head including the method of machining as claimed in claim 16, the method of configuring including the step of:

after machining the pattern into the surface of the slider of the magnetic head, then lapping the surface of the slider.

18. A method of machining a desired pattern into the air bearing surface of a slider of a magnetic head comprising the steps of:

providing a diamond die which has a working surface, the working surface having a pattern which is a reverse image of the desired pattern for the surface of the slider;

providing an elongated body which has a pair of oppositely facing ends;

connecting the diamond die to one of the ends of the body;

providing a transducer which vibrates ultrasonically;

connecting the transducer to the other end of the body;

positioning the die and the slider so that the patterned surface of the die faces the surface of the slider that is to be patterned;

placing an abrasive slurry between the patterned surface of the diamond die and the air bearing surface of the slider;

activating the transducer to vibrate the slurry; and ultrasonically reciprocating the die and the slider with respect to one another until the slurry grinds the air bearing surface of the slider to the desired pattern.

19. A method as claimed in claim 18 wherein the step of providing the die includes the steps of:

providing a solid piece of diamond material for the diamond die; and laser etching the solid piece of diamond material with the reverse image of the desired pattern for the surface of the slider.

20. A method as claimed in claim 18 wherein the step of providing the die includes the steps of:

providing a rigid piece of material with a reverse image of the desired pattern for the surface of the slider; and coating the rigid piece of material with diamond material.

21. A method as claimed in claim 18 wherein the step of ultrasonically reciprocating the die and the slider with respect to one another includes the step of:

reciprocating the diamond die toward and away from the surface of the slider at a rate of 19 KHZ–21 KHZ.

22. A method as claimed in claim 18 including the step of:
using a slurry of a carbide with a grit size of 1000–1500 in a water base.

23. A method as claimed in claim 18 wherein the step of ultrasonically reciprocating the die and the slider with respect to one another includes the steps of:
fixedly positioning the transducer; and
feeding the slider toward the die until the slurry grinds the desired pattern into the air bearing surface of the slider.

24. A method as claimed in claim 23 including the steps of:
positioning the diamond die with its patterned surface facing upwardly; and
positioning the magnetic head with the air bearing surface of its slider facing downwardly.

25. A method of simultaneously machining a plurality of sliders comprising the steps of:
providing a plurality of magnetic heads and accompanying sliders with the sliders arranged in rows and columns;
providing a plurality of diamond dies arranged in rows and columns which correspond to the number and arrangement of the sliders, each diamond die having a working surface with a pattern which is a reverse image of a desired pattern for a respective surface of a corresponding slider;
providing an elongated body which has a pair of oppositely facing ends;
connecting the diamond dies to one of the ends of the body;
providing a transducer which vibrates ultrasonically;
connecting the transducer to the other end of the body;
positioning the dies and the sliders so that the patterned surfaces of the dies face the surfaces of the sliders that are to be patterned;
placing an abrasive slurry between the patterned surfaces of the diamond dies and the air bearing surfaces of the slider;
activating the transducer to vibrate the slurry;
ultrasonically reciprocating the dies and the sliders with respect to one another; and
relatively moving the dies and the sliders toward one another until the slurry grinds the air bearing surfaces of the sliders to the desired patterns.

26. A method as claimed in claim 25 including the steps of:
each row being approximately 50 mm long and containing approximately 26 heads;
measuring the pressure of the diamond dies against the air bearing surfaces of the sliders; and
maintaining the pressure at approximately 1½ kg per row until the sliders are ground to the desired pattern.

27. A method as claimed in claim 25 wherein the step of providing the diamond dies includes the steps of:
providing a solid piece of diamond material for the diamond dies; and
laser etching the solid piece of diamond material with the reverse image of the desired patterns for the surfaces of the sliders.

28. A method of configuring the air bearing surfaces of the sliders including the method of claim 27, the method of configuring including the step of:

after machining the patterns into the surfaces of the sliders, then lapping the surfaces of the sliders.

29. A method as claimed in claim 28 including the steps of:
positioning the diamond dies with their patterned surfaces facing upwardly; and
positioning the sliders with their air bearing surfaces facing downwardly.

30. A method of simultaneously machining a plurality of sliders comprising the steps of:
providing a plurality of magnetic heads and accompanying sliders with the sliders arranged in rows and columns;
providing a plurality of diamond dies arranged in rows and columns which correspond to the number and arrangement of the sliders, each diamond die having a working surface with a pattern which is a reverse image of a desired pattern for a respective surface of a corresponding slider;
providing an elongated body which has a pair of oppositely facing ends;
connecting the diamond dies to one of the ends of the body;
providing a transducer which vibrates ultrasonically;
connecting the transducer to the other end of the body;
positioning the diamond dies with their patterned surfaces facing upwardly;
positioning the magnetic heads with the air bearing surfaces of their sliders facing downwardly;
positioning the dies and the sliders so that the patterned surfaces of the dies face the surfaces of the sliders that are to be patterned;
placing an abrasive slurry between the patterned surfaces of the diamond dies and the air bearing surfaces of the sliders;
activating the transducer to vibrate the slurry;
ultrasonically reciprocating the dies and the sliders with respect to one another; and
relatively moving the dies and the sliders toward one another until the slurry grinds the air bearing surfaces of the sliders to the desired patterns.

31. A method of configuring the air bearing surfaces of the sliders including the method of machining as claimed in claim 30, the method of configuring including the step of:
after machining the patterns into the surfaces of the sliders of the magnetic heads, then lapping the surfaces of the sliders.

32. A method as claimed in claim 31 wherein the step of ultrasonically reciprocating the dies and the sliders includes the step of:
reciprocating the diamond dies toward and away from the surfaces of the sliders at a rate of 19 KHZ–21 KHZ.

33. A method as claimed in claim 32 including the step of:
using a slurry which includes a carbide with a grit of 1000–1500 in a water base.

34. A method as claimed in claim 33 including the steps of:
each row being approximately 50 mm long and containing approximately 26 heads;
measuring the pressure of the diamond dies against the air bearing surfaces of the sliders; and
maintaining the pressure at approximately 1½ kg per row until the sliders are ground to the desired pattern.

* * * * *